2,831,034

POLYOXYALKYLENE GLYCOL ETHERS OF GLYCERINE

Malcolm E. Pruitt and William A. Rogers, Jr., Lake Jackson, Tex., assignors to The Dow Chemical Company, Midland, Mich., a corporation of Delaware No Drawing. Application December 7, 1953
Serial No. 396,772

10 Claims. (Cl. 260—615)

This invention relates to new trihydroxy polyoxyalkylene ethers of glycerol and a method for their preparation.

The new compounds of the invention are trihydroxy polyoxyalkylene ethers of glycerol in which the glycerol nucleus is substituted by polyoxyalkylene ether chains each of which consists of a polyoxy-1,2-propylene portion adjacent to the glycerol nucleus and a polyoxyethylene portion remote therefrom. These compounds are good non-ionic surface active agents, the glyceryl-polyoxy-1,2-propylene portion of the molecule being apparently repelled by water or hydrophobic in nature and the polyoxyethylene portion being attracted to water or hydrophilic. Since non-ionic surface active agents do not ionize but depend chiefly upon hydroxyl groups and ether linkages to create the hydrophilic chain, the new compounds of the invention are comparatively insensitive to hard water and electrolytes. More particularly, these compounds are useful for preparing stable water emulsions of organic chemicals such as parasiticides and insecticides which are valuable for the control of certain health, household, and agriculture pests. Emulsions such as these are formed quickly and easily with little or no agitation when the new compounds of the invention are employed as emulsifying agents.

An object of this invention is to prepare new trihydroxy polyoxyalkylene ethers of glycerol. A related object is to provide a process whereby these compounds can be prepared in good conversions and yields.

These and other objects are accomplished by first reacting glycerol with 1,2-propylene oxide to give polyoxy-1,2-propylene ethers of glycerol. These intermediates are reacted with ethylene oxide as hereinafter described. The two-step reaction is carried out under relatively moisture-free conditions in the presence of a suitable condensation catalyst such as an alkali metal hydroxide catalyst, e. g. sodium hydroxide or potassium hydroxide. The reaction may be conducted either batchwise or continuously as desired. In batchwise operation, commercially anhydrous glycerol, preferably greater than 99 percent pure, is charged into a suitable dry reaction vessel such as an autoclave and mixed with an effective amount of catalyst, usually 14 to 15 percent of alkali metal hydroxide based on the weight of glycerol. This represents less than 1.0, and usually less than 0.2 percent by weight of catalyst in terms of the total amount of reactants, including the weight of both alkylene oxides appearing in the reaction product. Prior to the introduction of 1,2-propylene oxide, the reaction vessel is advantageously flushed with a stream of dry inert gas, such as nitrogen, to remove any air or oxygen therefrom. The elimination of molecular oxygen from the reaction vessel is an important factor in obtaining colorless products and may, if desired, be carried out after adding glycerol and catalyst to the reaction vessel.

After these preliminaries, the reaction vessel is heated to bring the contents thereof to a temperature at which 1,2-propylene oxide will readily react with glycerol. Ordinarily a reaction temperature slightly in excess of 100° C. is satisfactory. Thereupon 1,2-propylene oxide is gradually added to the glycerol-alkali metal hydroxide solution under conditions of good mixing. Due to the exothermic nature of the reaction, it usually becomes necessary to remove excess heat from the reaction mixture to maintain the temperature of reaction below approximately 160° C. and preferably within the range of about 120° to 140° C. Under these conditions, the rate of addition of 1,2-propylene oxide is desirably such as to maintain in the reactor a pressure of from about 30 to 40 pounds per square inch gauge. The addition of 1,2-propylene oxide is continued until at least 40 and desirably from 50 to 80 parts by weight of 1,2-propylene oxide have been reacted per part by weight of glycerol. To prepare these intermediate trihydroxy polyoxy-1,2-propylene ethers of glycerol which may in turn be reacted with ethylene oxide to obtain surface active compounds with exceptionally good emulsifying properties, preferably 60 to 70 parts of 1,2-propylene oxide are employed per part by weight of glycerol.

When all of the propylene oxide has been added and reaction is substantially complete, ethylene oxide is added gradually to the reaction mixture at a rate such as to maintain the pressure at about 30 to 40 p. s. i. g. while the temperature is again maintained in the range of from about 120° to 140° C. The addition of ethylene oxide is continued until from about 0.4 to 0.8 of a part by weight of ethylene oxide has been reacted per part by weight of the intermediate material, i. e. the trihydroxy polyoxy-1,2-propylene ether of glycerol. Those of these final products which possess the best emulsifying properties result from reacting about 0.5 to 0.7 pound of ethylene oxide per pound of preferred intermediate material as defined above. After the predetermined proportion of ethylene oxide has been introduced into the vessel and condensation has progressed to the desired extent, the reaction may be terminated by neutralizing the catalyst, e. g. with glacial acetic acid. The neutralized material usually constitutes the final product of the invention, and is ready for use or sale as such. If desired, it may be further purified somewhat by washing with water and removing volatile matter, if any, by fractional distillation at reduced pressure.

The product so prepared is, for the most part, a complex mixture of trihydroxy polyoxyalkylene ethers of glycerol in which the length of the hydroxy polyoxyalkylene chains vary considerably from one molecule to another in the mixture. In other words, a given product, having some particular viscosity, and hence a definite average molecular weight, is actually a complex mixture of molecular species with a considerable spread in individual molecular weights. However, all these trihydroxy polyoxyalkylene ethers of glycerol according to the invention are believed to have three polyoxy-1,2-propylene chains attached to the glycerol nucleus and three hydroxy polyoxyethylene chains in turn attached to the polyoxy-1,2-propylene chains.

Upon reacting an average of at least 63 oxy-1,2-propylene groups and an average of at least 33 oxyethylene groups per glycerol molecule, the advantageous emulsifying properties of the new products begin to be obtained. This is an average of at least 96 oxyalkylene groups per glycerol nucleus of which the oxy-1,2-propylene groups in this particular case comprise 65 mole percent of the total. Better emulsifying compounds are obtained, however, when one mole of glycerol is reacted according to the invention with an average of at least 120 moles of alkylene oxides, of which the oxy-1,2-propylene portion constitutes from at least 48 to about 66 mole percent of the total. Optimum emulsifying properties are exhibited by those new compounds in which the oxy-1,2-propylene groups account for 51 to 60 mole percent of the total oxyalkylene groups. Ordinarily no greater than 126 oxy-1,2-propylene groups nor more than 135 oxyethylene groups are reacted per molecule of glycerol since above these values the resultant products are usually solids.

The new trihydroxy polyoxyethylene-polyoxy-1,2-propylene ethers of glycerol may also be defined in terms of the number of oxyalkylene groups which have been reacted per hydroxyl group of glycerol, the average number for 1,2-propylene oxide being at least 21 and preferably greater than 27 and the average number of moles of ethylene oxide being at least 11 and preferably greater than 14. For practical purposes, an average of no greater than 42 1,2-propylene oxide groups and no greater than 45 ethylene oxide groups are reacted per hydroxyl group of glycerol since above these values, the products are for the most part solids. Unusually good emulsifying compounds of the invention are obtained when an average of from 32 to 37 1,2-propylene oxide groups and from 21 to 35 ethylene oxide groups are reacted per hydroxyl group of glycerol.

Since it is particularly difficult to determine the average molecular weights of the reaction products of the invention, i. e. the trihydroxy polyoxyalkylene ethers of glycerol, these products are best defined as hereinbefore stated in terms of the quantity of 1,2-propylene oxide and of ethylene oxide reacted with glycerol. From a practical standpoint, the quantity of each alkylene oxide is most conveniently expressed in terms of parts by weight, e. g. pounds. Accordingly those of these products which have been found to possess the best emulsifying properties are formed by condensing 1 pound of glycerine with greater than 50 and preferably from 60 to 70 pounds of 1,2-propylene oxide and then with ethylene oxide. Since the amount of ethylene oxide to be reacted is dependent not only upon the initial weight of glycerol but upon that of the 1,2-propylene oxide condensed therewith, the amount of ethylene oxide so employed may conveniently be stated in terms of parts by weight based on the 1,2-propylene oxide-glycerol intermediate condensation product, preferably from 0.5 to 0.7 pound of ethylene oxide per pound thereof.

In making the non-ionic products of the invention, it is desirable that the starting materials contain as little water as possible in order to avoid undesirable side-reactions. In general, essentially anhydrous reaction conditions are employed, i. e. the combined reactants contain less than 0.2 percent and preferably less than 0.1 percent by weight of water. Commercially available glycerol of greater than 99 percent purity and containing less than 0.5 percent water is usually preferred for best results. Under optimum conditions, the moisture content of the alkaline oxide feed is ordinarily less than 0.1 percent for propylene oxide and less than 0.01 percent for ethylene oxide. Products with satisfactory emulsifying properties have been prepared employing propylene oxide containing as little as 0.035 and as much as 0.16 percent water.

The catalysts which may be employed in the condensation reaction are those commonly known for the condensation of alkylene oxides with alcohols. Alkaline catalysts, especially alkali metal hydroxides or alkali metal alcoholates, are best. The proportion of catalyst is ordinarily quite small, from 0.1 to 1.0 percent by weight of the total reactants, usually 0.2 percent or less being adequate. For convenience, all of the catalyst for the entire reaction is ordinarily dissolved in the glycerol before the addition of alkylene oxide begins. More catalyst can be added in the closing stages of any condensation which tends to become sluggish.

The temperature at which the condensation proceeds is fairly critical and should be in the range between about 100° C. and 160° C. In most instances, a temperature of at least 120° C. is required to secure acceptable reaction rates, particularly in making products of high molecular weight. On the other hand, above 140° C. there is a tendency for objectionable discoloration of the product. Since the condensation, once under way, is highly exothermic, cooling can be applied with advantage. Even with strong cooling, it is important to introduce the alkaline oxides gradually to avoid over-heating. In general, the operating pressure produced by the addition of alkylene oxide should be held in the range of 10 to 50 pounds per square inch gauge, with pressures over 100 pounds being carefully avoided to prevent the reaction from getting out of control. The alkylene oxide may be fed into the reaction vessel either as a gas or liquid as desired. Vigorous agitation is desirable to maintain a good dispersion of the catalyst and uniform reaction rates throughout the mass.

The course of the condensation can be followed roughly by consecutively metering in each alkylene oxide until the desired amount has been added. Agitation at a reaction temperature is continued until the pressure falls to a low value. The final reaction product may then be cooled, neutralized, and removed. The approximate average molecular weights of these products may be determined by measuring the weight percent of hydroxyl group (—OH) present (by acetylation) and reckoning three free hydroxyl groups per molecule. In general, the mixtures of trihydroxy polyoxyalkylene ethers of glycerol of the invention have less than about 1.5 weight percent OH as determined by acetylation and average molecular weights by acetyl value of at least 3500.

The products of the invention are virtually non-volatile, water-white to amber liquids which are exceptionally miscible with benzene and a wide variety of organic compounds but are only slightly soluble in water. These liquid products are stable in air, do not deposit gummy residues on heating, and are not corrosive toward metals. As previously stated, these compounds have good to excellent surface active properties, and are useful as textile chemicals and as wetting, dispersing, and emulsifying agents, especially for agricultural insecticides, pesticides, fungicides, and herbicides, particularly those which are chlorinated hydrocarbons. The emulsifying power of the new compounds is really unusual. They form stable oil-in-water emulsions extremely rapidly and with very little mixing. They are also useful for dispersing solids, such as pigments, in liquids and as blending and thickening agents for aqueous and non-aqueous media. Unlike many other surface active materials, they have such low oral toxicity and such low skin absorptivity as to be valuable ingredients of cosmetic preparations and dishwashing detergents.

Within the limits of the invention, the viscosities and other properties of the new liquid reaction products of glycerol can be varied to suit particular end uses by controlling the number of moles of propylene oxide and of ethylene oxide employed in the condensation reaction. The viscosities of these product mixtures are usually greater than 400 centistokes at 100° F. As might be expected, it was found that the pour-points and waxiness of the liquid condensation products increase with increasing ethylene oxide content.

*Example 1*

The following procedure describes the preparation of one of the glyceryl trihydroxy polyoxyalkylene ether products of the invention.

Into a glass-lined steel reaction vessel purged with dry nitrogen was charged 1.0 part by weight of commercial anhydrous glycerol of greater than 99.5 weight percent purity and 0.15 part by weight of potassium hydroxide pellets. The vessel was pressured with dry nitrogen to 75 pounds per square inch gauge and tested for leaks. Heat was then applied to the reactor and the temperature gradually brought to 130° C. Thereupon the pressure was bled down to about 3 pounds per square inch gauge and 1,2-propylene oxide was added gradually to the well-agitated glycerol-potassium hydroxide mixture at such a rate that the pressure was regulated between 30 and 50 pounds per square inch gauge to maintain the temperature in the range of about 110° to 135° C. The addition of 1,2-propylene oxide was continued for a period of about 5 hours until approximately 3.0 parts of 1,2-propylene oxide had been added per part by weight of glycerol. Thereafter the resultant reaction mixture, occupying approximately three-fourths of the volume of the glass-lined vessel, was digested at about 135° C. for 30 minutes, cooled to about 70° C., and transferred to a larger steel reaction vessel which had been thoroughly purged with dry nitrogen. The mixture so charged occupied about one twenty-fifth of the volume of the reaction vessel. Upon heating this mixture to about 130° C., the gradual addition of 1,2-propylene oxide was resumed under conditions of good agitation. The pressure was again regulated between 30 and 50 pounds per square inch gauge and the temperature maintained in the range of 120° to 145° C. for a period of about 10 hours. At the end of this time, a total of about 62.5 to 65.0 parts of 1,2-propylene oxide had been added per part by weight of the initial glycerol charged. Following the addition of all of the 1,2-propylene oxide, which contained an average of less than 0.10 weight percent water, the reaction mixture was digested for about 1 hour. A small sample of the reaction product was withdrawn at the end of the digestion period. This product was a clear, light amber liquid having an OH content (as determined by acetylation) of 1.63 weight percent and a viscosity of about 306 centistokes at 100° F.

Ethylene oxide containing less than 0.01 weight percent water was then passed gradually into the well-agitated glycerol-1,2-propylene oxide condensation product from the above reaction. Throughout the addition of ethylene oxide, the pressure and temperature were maintained in the ranges of 30 to 50 pounds per square inch gauge and 120° to 145° C. respectively. When a total of 36.3 parts of ethylene oxide had been added to the reaction vessel, the bulk of its volume was occupied by liquid product. The flow of ethylene oxide was then stopped and the product mixture was digested for 1 hour. Upon cooling the product to about 25° C., 0.17 part by weight of glacial acetic acid was added and thoroughly mixed into the product to neutralize potassium hydroxide employed as a catalyst.

The product was a viscous, light amber colored liquid which was very soluble both in acetone and benzene and only slightly soluble (less than 1 percent by weight) in water. The product was analyzed and found to have the following properties:

| | |
|---|---|
| Density at 25° C | 1.0420 |
| Viscosity in centistokes at 25° C | 1536 |
| Viscosity in centistokes at 100° F | 553 |
| Viscosity in centistokes at 210° F | 76.5 |
| A. S. T. M. pour point, °C | 18 |
| Surface tension of 0.1% solution in water in dynes/centimeter | 36.0 |
| Solubility in benzene at 25° C. (grams product per 100 grams benzene) | >100 |
| Percent OH, by acetylation | 0.91 |
| Average molecular weight (calculated from acetyl value) | 4855 |

*Example 2*

Some of the physical properties of a wide range of glyceryl polyoxyalkylene glycol products of the invention are listed in the accompanying table. All of these products were prepared in accord with the general procedure outlined in Example 1. The physical properties are all those of the product as taken from the reactor, before neutralization.

Column 1 gives the ratio in which 1,2-propylene oxide was reacted with glycerol, viz. 40, 50, 60 and 70 parts by weight of 1,2-propylene oxide per part by weight of glycerol. In column 2 are tabulated the various weight ratios in which ethylene oxide was reacted with each of the four different glycerol-1,2-propylene oxide intermediate condensation products. These ratios range from 0.44 to 0.65 part by weight of ethylene oxide per part by weight of intermediate product. Column 2 also includes values for each of the four glycerol-1,2-propylene oxide intermediate products prior to additions of the ethylene oxide.

Column 3 contains the hydroxyl values in percent by weight as determined by acetylation. Column 4 lists the approximate average molecular weights of these products as calculated from the hydroxyl values by reckoning 3 free hydroxyl groups per molecule.

In columns 5 through 10 are tabulated the viscosities in centistokes at the temperatures indicated, the A. S. T. M. pour points in ° C., the densities at the given temperatures, the refractive indices ($n/D$) at 25° C., the surface tensions in dynes per centimeter of the products per se (100 percent), and the surface tensions of 0.10 percent solutions of the products in distilled water.

| Wt. Ratio of P. O. to Glycerol | Wt. Ratio of E. O. to P. O., Glycerol | Wt. Percent OH | Mol. Wt. | Viscosity,[1] centistokes | Pour Point, ° C. | Density, gms. per cm.³ | Refractive Index, n/D at 25° C. | Surface Tension (100%), dynes per cm. | Surface Tension (0.1%), dynes per cm. |
|---|---|---|---|---|---|---|---|---|---|
| 40 | 0.0 | 2.13 | 2,394 | 258 (100° F.) | | | | | |
| 40 | 0.44 | 1.46 | 3,494 | 443 (100° F.) | 10 | 1.038 (20° C.) | 1.4567 | 36.9 | 40.2 |
| 40 | 0.51 | | | 511 (100° F.) | 16 | 1.043 (20° C.) | 1.4574 | 37.0 | 42.5 |
| 40 | 0.57 | | | 542 (100° F.) | 16 | 1.046 (20° C.) | 1.4575 | 37.1 | 41.8 |
| 40 | 0.62 | 1.32 | 3,864 | 589 (100° F.) | 13 | 1.047 (20° C.) | 1.4582 | 37.1 | 42.8 |
| 40 | 0.65 | 1.32 | 3,864 | | | | | 37.9 | 42.5 |
| 50 | 0.0 | 1.78 | 2,865 | 296 (100° F.) | | | | | |
| 50 | 0.44 | | | 404 (100° F.) | −6 | 1.032 (20° C.) | 1.4560 | 36.5 | 38.8 |
| 50 | 0.51 | 1.29 | 3,950 | 427 (100° F.) | −2 | 1.041 (20° C.) | 1.4563 | 36.7 | 39.0 |
| 50 | 0.57 | 1.26 | 4,050 | 523 (100° F.) | 16 | 1.043 (20° C.) | 1.4576 | 36.9 | 39.9 |
| 50 | 0.62 | 1.26 | 4,050 | 628 (100° F.) | 21 | 1.045 (20° C.) | 1.4587 | 36.7 | 40.0 |
| 50 | 0.65 | | | | 17 | 1.045 (20° C.) | 1.4585 | 36.7 | 40.4 |
| 60 | 0.0 | 1.70 | 3,000 | 328 (100° F.) | | | | | |
| 60 | 0.44 | 1.09 | 4,670 | 67.2 (210° F.) | 32 | 1.024 (50° C.) | 1.4563 | 38.1 | 38.4 |
| 60 | 0.51 | 1.10 | 4,680 | 73.1 (210° F.) | 36 | 1.030 (50° C.) | 1.4571 | 37.2 | 39.7 |
| 60 | 0.57 | | | 76.8 (210° F.) | 36 | 1.032 (50° C.) | 1.4581 | 39.7 | 39.8 |
| 60 | 0.62 | 1.03 | 4,952 | 81.8 (210° F.) | 35 | 1.033 (50° C.) | 1.4586 | | 39.8 |
| 60 | 0.65 | 1.02 | 5,000 | 85.2 (210° F.) | 35 | 1.035 (50° C.) | 1.4585 | | 39.9 |
| 70 | 0.0 | 1.52 | 3,553 | 356 (100° F.) | | | | | |
| 70 | 0.44 | 1.08 | 4,720 | 701 (100° F.) | 30 | 1.039 (30° C.) | 1.4562 | 36.6 | 39.8 |
| 70 | 0.51 | 0.98 | 5,200 | 77.4 (210° F.) | 33 | 1.041 (30° C.) | 1.4571 | 36.5 | 36.3 |
| 70 | 0.57 | 1.04 | 4,905 | 82.9 (210° F.) | 34 | 1.034 (40° C.) | 1.4576 | 37.4 | 36.0 |
| 70 | 0.62 | 0.94 | 5,430 | 90.0 (210° F.) | 36 | 1.043 (40° C.) | 1.4588 | 41.2 | 37.1 |
| 70 | 0.65 | 0.88 | 5,800 | 92.4 (210° F.) | 34 | 1.034 (50° C.) | 1.4593 | | 37.0 |

[1] A. S. T. M. Method: D 445–52 T.

Example 3

The ease with which these glyceryl polyoxyalkylene glycols emulsify petroleum oils in water is conclusively demonstrated by the following tests in which the new non-ionic products of the invention are compared to several well-known commercial emulsifying agents.

In these tests, the emulsifying power of the surface active agent was evaluated by measuring the light-scattering of an aqueous emulsion of a petroleum oil (Shell E-407). The emulsion was prepared by shaking for exactly 90 seconds on a mechanical shaker, 2 milliliters of the oil with 18 milliliters of a 1.0 percent aqueous solution of the surface active agent. After standing for 24 hours, the reflectance of the resultant emulsion was measured on a photovolt reflection meter, model 610. The reflectance value measures light scattered at 45° from a test tube containing the emulsion. The scale of the instrument is such that 75.5 percent of the reflectance from a magnesia block reads 100 and no reflectance at all reads 0. The highest reflectance value corresponds to the best emulsification. All of the emulsions employed in the tests were stable and showed no signs of oil separation at the end of 24 hours.

The glyceryl polyoxyalkylene glycols of the invention, hereinafter referred to as G. P. G., were prepared according to the general procedure of Example 1 by first reacting 1 part by weight of glycerol with 70 parts by weight of propylene oxide and then reacting each part by weight of the glyceryl-propylene oxide intermediate material with from 0.42 to 0.67 part by weight of ethylene oxide. Thus, G. P. G. —0.42 is a glyceryl polyoxyalkylene glycol as defined above prepared by condensing each part by weight of intermediate material with 0.42 part by weight of ethylene oxide.

The commercial emulsifying agents which were compared with the surface active agents of the invention were:

Glim—a nonionic surfactant consisting essentially of an ethylene oxide condensation product of an alkyl phenol, probably nonyl phenol Stephanol M. E.—a higher sodium alkyl sulfate Triton X-100—a nonionic surface active agent, consisting of a polyoxyethylene glycol monoether of isooctyl phenol As will be seen from the following table, the aqueous petroleum oil emulsions prepared with the aid of the surface active products of the invention have considerably higher reflectance values and are therefore much more finely dispersed than those emulsions produced with the above-described commercial emulsifying agents not in accord with the invention.

| Surface Active Agent | Reflectance |
|---|---|
| Products of the invention: | |
| G. P. G.—0.42 | 56 |
| G. P. G.—0.46 | 55 |
| G. P. G.—0.50 | 38 |
| G. P. G.—0.54 | 32 |
| G. P. G.—0.58 | 25 |
| G. P. G.—0.63 | 23 |
| G. P. G.—0.67 | 22 |
| Commercial Products: | |
| Glim | 7.5 |
| Stephanol M. E. | 5.5 |
| Triton X-100 | 6.5 |

That which is claimed is:

1. A mixture of trihydroxy polyoxyalkylene ethers of glycerol wherein three polyoxy-1,2-propylene chains are attached to the glycerol nucleus and three hydroxy polyoxyethylene chains are in turn attached to said polyoxy-1,2-propylene chains, the oxy-1,2-propylene groups comprising no more than 66 mole percent of the total oxyalkylene groups, and the average number of oxy-1,2-propylene groups per glycerol nucleus in said mixture being at least 63 and that of the oxyethylene groups being at least 33.

2. A mixture of trihydroxy polyoxyalkylene ethers of glycerol in which the polyoxyalkylene ether chains consist of a polyoxy-1,2-propylene portion adjacent to the glycerol nucleus and a polyoxyethylene portion remote therefrom, there being an average of at least 96 oxyalkylene groups and an average of at least 63 oxy-1,2-propylene groups per glycerol nucleus said oxy-1,2-propylene groups comprising from about 48 to 66 mole percent of the total oxyalkylene groups.

3. A mixture of trihydroxy polyoxyalkylene ethers of glycerol according to claim 2 wherein the weight percent OH as determined by acetylation is less than about 1.5 percent and the viscosity at 100° F. is greater than about 400 centistokes.

4. A mixture of trihydroxy polyoxyalkylene ethers of glycerol according to claim 2 wherein there are an average of at least 120 oxyalkylene groups per glycerol nucleus.

5. A mixture of trihydroxy polyoxyalkylene ethers of glycerol according to claim 4 wherein the oxy-1,2-propylene groups represent from about 51 to 60 mole percent of the total.

6. A mixture of trihydroxy polyoxyalkylene ethers of glycerol according to claim 4 wherein the average molecular weight of the said mixture by acetyl value is at least 3500.

7. A mixture of trihydroxy polyoxyalkylene ethers of glycerol, each polyoxyalkylene chain of which consists of oxy-1,2-propylene units adjacent to the glycerol nucleus and oxy-ethylene units remote therefrom, said mixture having an average of from 40 to 80 parts by weight of polyoxy-1,2-propylene units per part of glycerol and an average of from about 0.4 to 0.8 part of polyoxyethylene units per part of the glycerol-polyoxy-1,2-propylene portion.

8. A mixture of trihydroxy polyoxyalkylene ethers of glycerol, said compounds containing in their structure oxy-ethylene groups, oxypropylene groups, and a glycerol nucleus; the compounds being characterized in that the oxypropylene groups are present in polyoxypropylene chains that are attached to the glycerol nucleus, one polyoxypropylene chain, being attached to each oxygen atom of the glycerol nucleus, thereby constituting a polyoxypropylene glycerol polymer portion; the oxyethylene groups being present in polyoxyethylene chains, one polyoxyethylene chain being attached to the end of each polyoxypropylene chain; the average molecular weight of the polyoxypropylene glycerol polymer portions in the mixture being at least 2950, as determined by hydroxyl number, and the oxyethylene groups being present in an amount equal to from 0.4 to 0.8 part by weight per part of the polyoxypropylene glycerol polymer portions.

9. A mixture of trihydroxy polyoxyalkylene ethers of glycerol according to claim 8 wherein the average molecular weight of the polyoxypropylene glycerol polymer portions in the mixture is in the range of from 2950 to 3553.

10. A mixture of trihydroxy polyoxyalkylene ethers of glycerol according to claim 9 wherein there is from 0.5 to 0.7 part by weight of oxyethylene groups per part of the polyoxypropylene glycerol polymer portions.

References Cited in the file of this patent
UNITED STATES PATENTS

| 2,448,664 | Fife | Sept. 7, 1948 |
| 2,674,619 | Lundsted | Apr. 6, 1954 |

OTHER REFERENCES

"Pluronics," Wyandotte Chem. Corp., Wyandotte, Mich. Printed September 1952. 12 pps.